United States Patent [19]

Sheen

[11] Patent Number: 4,802,503

[45] Date of Patent: Feb. 7, 1989

[54] CONTROL VALVE FOR FLUSHING SYSTEM

[76] Inventor: Guang-Yue Sheen, No. 1-2, Lane 23, Yeong Chang Third St., Taichung, Taiwan

[21] Appl. No.: 216,290

[22] Filed: Jul. 8, 1988

[51] Int. Cl.⁴ ............................................. F16K 31/26
[52] U.S. Cl. .................................. 137/413; 137/426; 137/444; 251/45
[58] Field of Search ............... 137/412, 413, 414, 415, 137/426, 434, 443, 444; 251/45; 25/46; 73/322.5

[56] References Cited

U.S. PATENT DOCUMENTS

| | | | |
|---|---|---|---|
| 966,921 | 8/1910 | Jones | 137/414 |
| 1,205,898 | 11/1916 | Jones | 137/413 |
| 1,302,538 | 5/1919 | Gulick | 137/413 |
| 1,323,960 | 12/1919 | Burrill | 137/444 |
| 2,092,670 | 9/1937 | Hess et al. | 137/413 |
| 2,833,300 | 5/1958 | Sirotek | 137/414 |
| 3,145,729 | 8/1964 | Cordis | 137/414 |
| 3,335,747 | 8/1967 | Schipper | 137/414 |
| 4,453,560 | 6/1984 | Nestich et al. | 137/426 |
| 4,573,495 | 3/1986 | Rothe et al. | 137/414 |

FOREIGN PATENT DOCUMENTS 1172565  6/1964  Fed. Rep. of Germany ...... 137/414

Primary Examiner—George L. Walton
Attorney, Agent, or Firm—Morton J. Rosenberg

[57] ABSTRACT

A control valve which includes a main body, a stop valve, a spring-loaded control rod, a support rod and a corresponding shaft, a lid with a fixing element on it, a guide rod and a float cylinder. The float cylinder is restrained only to mover vertically on the guide rod. The stop valve moves vertically in a valve chamber on the upper end of the main body under the influence of water pressure. As water is flushed from the reservoir, the float descends along with the water level and causes the control rod to allow water flow from the upper part of the valve chamber, so that water can flow into the reservoir.

1 Claim, 4 Drawing Sheets

CONTROL VALVE FOR FLUSHING SYSTEM

BACKGROUND OF THE INVENTION

This invention relates to a control valve for a flushing system, and in particular relates to a control valve employing a float cylinder which slides up and down on a guide rod.

In the past, conventional control valves for flushing systems had structures essentially as shown in FIG. 5. Such conventional control valve typically comprises a ball-type float A, a shaft B, a pivot G, a plunger valve C, a water inlet E, a pipe F, and a valve seat D. This type of control valve is unstable since the float A and shaft B are subject to lateral movement, causing localized stress on the pivot G and sometimes causing the plunger valve to close improperly. A second problem with conventional control valves as shown in FIG. 5 is that due to the nature of the valve, the pipe used therein is relatively long, thereby wasting material.

It is the purpose of this present invention, therefore, to mitigate and/or obviate the above-mentioned drawbacks in the manner set forth in the detailed description of the preferred embodiment.

SUMMARY OF THE INVENTION

A primary objective of this invention is to provide a flushing system control valve which is not subject to lateral movement.

Another object of this invention is to provide a flushing system control valve which uses very little piping.

Further objectives and advantages of the present invention will become apparent as the following description proceeds, and the features of novelty which characterize the invention are pointed out with particularity in the claims annexed to and forming a part of this invention.

DETAILED DESCRIPTION OF THE PREFERRED EMBODIMENT

Figure 1:
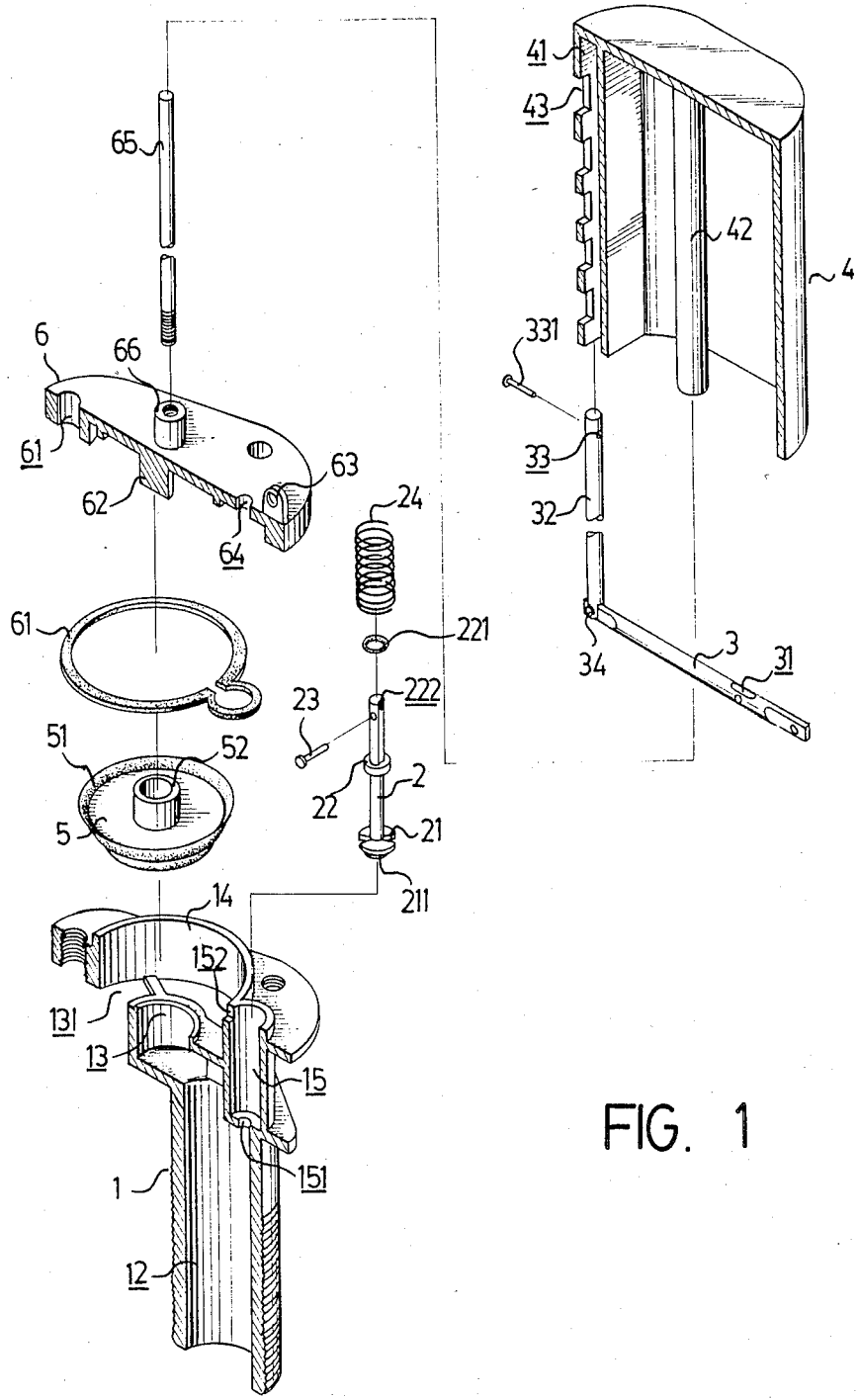
FIG. 1 is an exploded view of a flushing system control valve in accordance with the present invention.

Referring to FIG. 1, it can be seen that the flushing system control valve of the present invention comprises the combination of a main body 1, a control rod 2, a support rod 3, a shaft 32, a stop valve 5, a lid 6 and a float cylinder 4.

The main body 1 includes an inlet channel 12, an outlet port 13, a valve chamber 14, and a control stud cavity 15. The upper portion of the inlet channel 12 communicates with the outlet port 13 and the upper end of the outlet end 13 opens into the valve chamber 14. The inlet channel 12 also communicates with the control stud cavity 15 via a stop hole 151 which is situated therebetween.

The control rod 2 has a notched stopper 21 on its lower end and a seal on its lowermost end. The control rod 2 is movable in the control stud cavity 15. A plug 22 is positioned roughly mid-way up the control rod 2. A spring 24 encompasses the control rod 2, and is retained on a lower end of the control rod 2 by the notched stopper 21.

Figure 2:
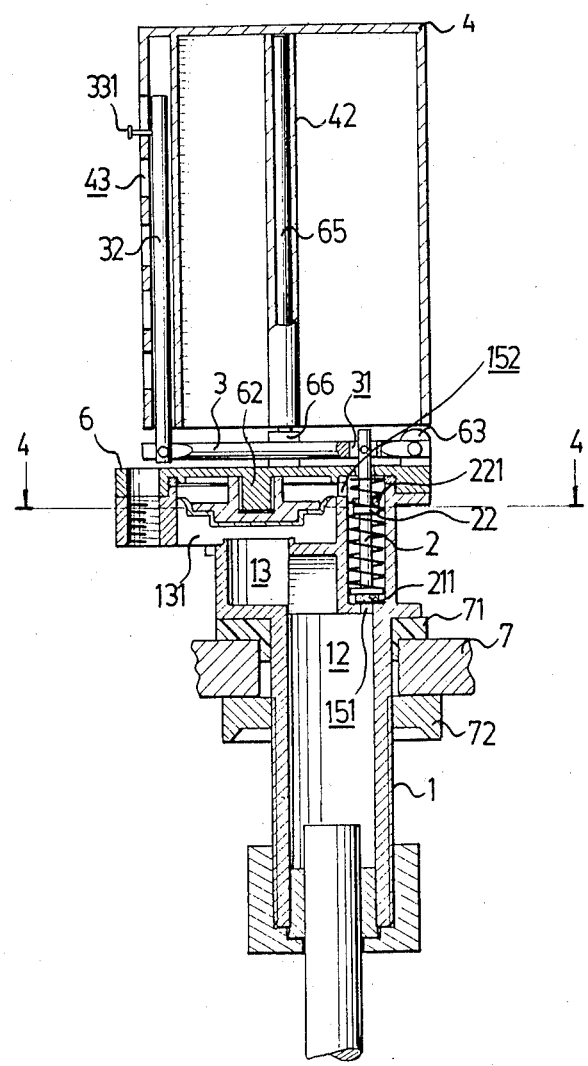
FIG. 2 is a cutaway view of the flushing system control valve of FIG. 1 in flush position.

Referring to FIG. 2, it can be seen that the stop valve 5 has a substantially stepped disk shape with a cylindrical sleeve 52 on its upper side and a pliable valve cover 51 which fits snuggly on its lower side for providing water-tight engagement with the valve chamber 14.

Figures 3, 4:
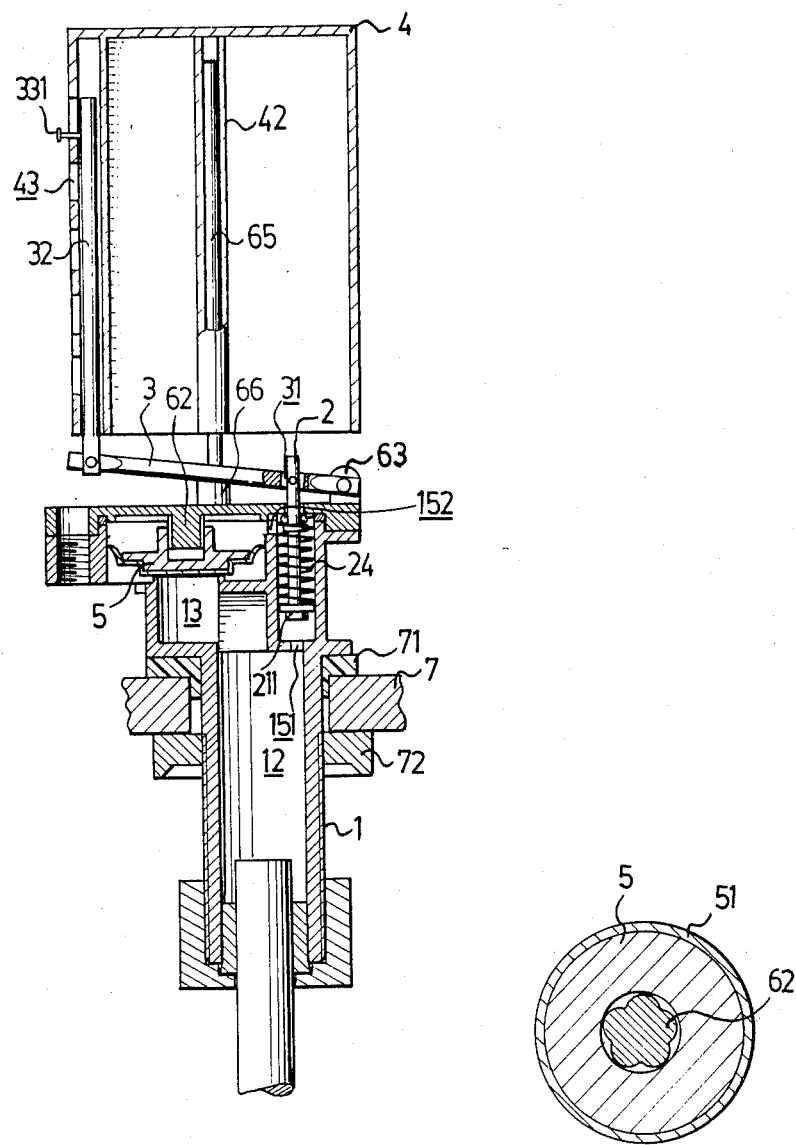
FIG. 3 is the same as FIG. 2, but in non-flush position.
FIG. 4 is a cutaway view of the stop valve and protrusion therein.
Figure 5:
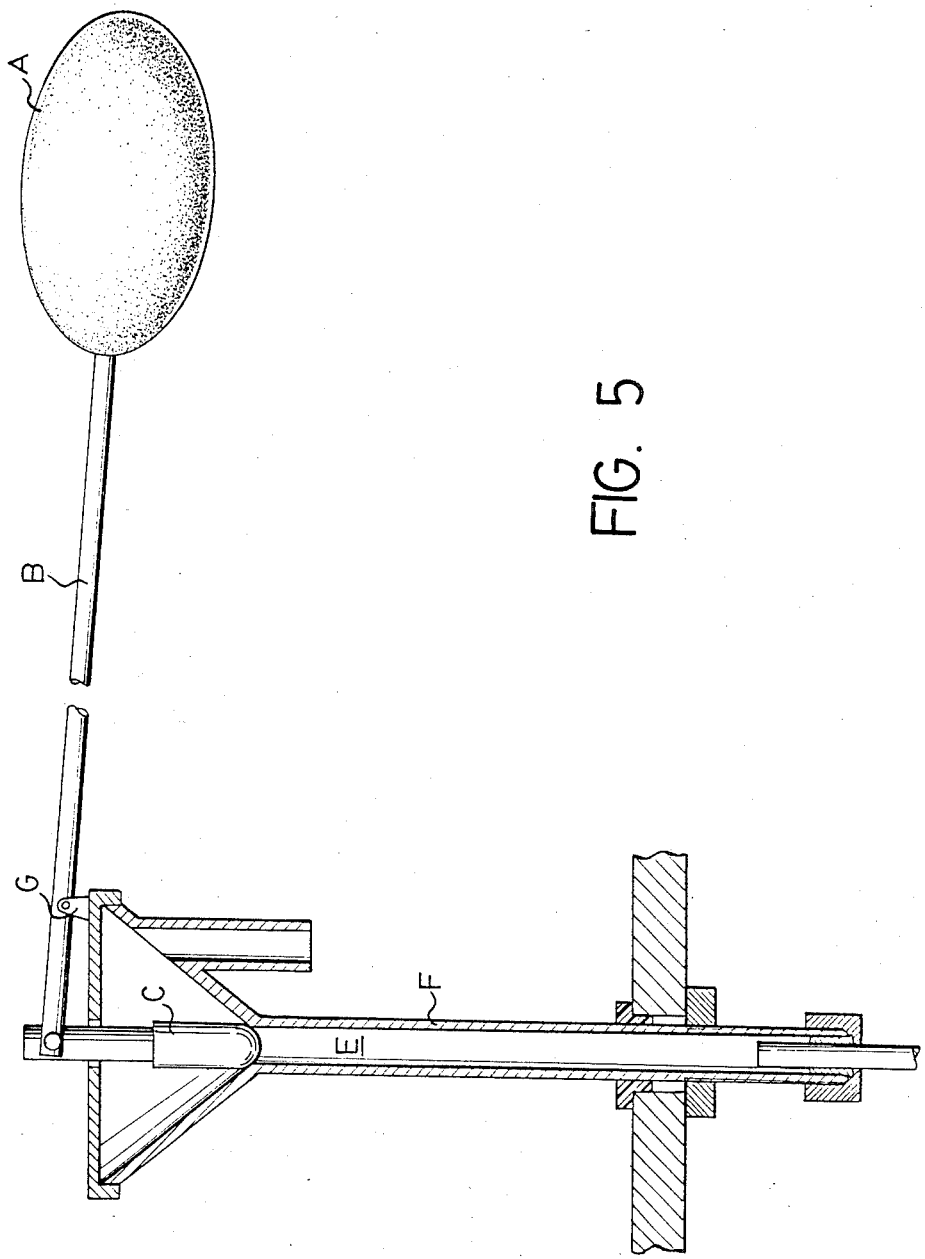
FIG. 5 is a partially cutaway view of a conventional flushing system.

As seen from FIG. 1, 2 and 3, the lid 6 comprises a fixing element 66, a protrusion 62, a pressure outlet two-way flow channel 64, and a gasket 61. The gasket 61 is located on the uppermost end of the main body 1. The lid 6 fits tightly on the upper portion of the main body 1 and the lower end of the guide rod 65 is threadably fixed at the fixing element 66. The sleeve 52 is vertically slidable on the protrusion 62.

One end of the support rod 3 is pivotally connected at the lug 63 and a second end of the support rod 3 is pivotally connected to a shaft 32. The shaft 32 has a hole 33 at its upper end. A pin 331 is secured in the hole 33 and partially protrudes therefrom.

The float cylinder 4 has a cylindrical guide sleeve 42 therein for vertical slidability on the guide rod 65. The float cylinder 4 also has a shaft cavity 41 for housing the shaft 32. The float cylinder 4 also has a plurality of adjustment notches 43 which are integrally formed in an outer part of the shaft cavity 41. The setting pin 331 of the shaft 32 is placeable on any of the plurality of adjustment notches 43 for adjusting the range of the float cylinder 4; i.e., the higher the setting pin 331 is set on the notches, the smaller the range of vertical slideability of the float cylinder 4.

The float cylinder 4 in a non-flush position is bouyed up by a full reservoir 7 of water so that the shaft 32 is elevated a corresponding distance with the float cylinder 4, as seen in FIG. 3. The shaft 32 causes the support rod 3 to support the control rod 2 so that the plug 22 of the control rod 2 closes the two way channel 64 (seen best in FIG. 1) and hence prevents water from flowing to or from passage 152 when float cylinder 4 is in non-flush position. This has the effect of stabilizing the water level.

When the float cylinder 4 is in a flush position, as shown in FIG. 2, the lower end of the guide sleeve 65 rests on the fixing element 66 so that the shaft 32 is in its lowest position, thereby causing the support rod 3 and the control rod 2 to be in their lowest positions. The passage 152 and the two way channel are open when the float cylinder 4 is in flush position so that water is urged out of an upper part of the valve chamber 14 under the upward pressure of water on the lower side of the stop valve 5. This allows water to flow freely into the reservoir 7 until the float reaches non-flush position.

As various possible embodiments might be made of the above invention without departing from the scope of the invention, it is to be understood that all matter herein described or shown in the accompanying drawing is to be interpreted as illustrative and not in a limiting sense. Thus it will be appreciated that the drawings are exemplary of a preferred embodiment of the invention.

I claim:

1. A flushing system control valve comprising the combination of:

(a) a main body (1) having an inlet channel (12), an outlet port (13), a valve chamber (14), and a control study cavity (15); an upper portion of said inlet channel (12) communicating with said outlet port (13); an upper end of said outlet port (13) opening into said valve chamber (14); said inlet channel (12) also communicating with said control stud cavity (15) via a stop hole (151) situated therebetween;

(b) a control rod (2) having a notched stopper (21) on a lower end thereof and a seal on a lowermost end thereof; said control rod (2) being movable in said control stud cavity (15) through a two-way flow channel (64); a plug (22) being positioned roughly mid-way up said control rod (2); a spring (24) encompassing said control rod (2), said spring (24) being retained on a lower end thereof by said notched stopper (21);

(c) a stop valve (5) having a substantially stepped disk shape with a cylindrical sleeve (52) on an upper side thereof and a pliable valve cover (51) fitting on a lower side thereof for providing water-tight engagement with said valve chamber (14);

(d) a lid (6) comprising a fixing element (66), a protrusion (62), said two-way flow channel (64), and a gasket (61); said gasket (61) being located on an uppermost end of said main body (1); said lid (6) fitting tightly on an upper portion of said main body (1); a guide rod (65) being threadably fixed at a lower end thereof in said fixing element (66); said sleeve (52) being vertically slidable on said protrusion (62);

(e) a support rod (3); a lug (63) being disposed on said lid (6) one end of said support rod (3) being pivotally connected at said lug (63) and a second end of said support rod (3) being pivotally connected to a shaft (32); said shaft (32) having a hole (33) at an upper end thereof; a pin (331) being secured in said hole (33) and partially protruding therefrom;

(f) a float cylinder (4) having a cylindrical guide sleeve (42) therein for vertical slidability on said guide rod (65); said float cylinder (4) also having a shaft cavity (41) for housing said shaft (32); said float cylinder (4) having a plurality of adjustment notches (43) which are integrally formed in an outer part of said shaft cavity (41); said setting pin (331) of said shaft (32) being placeable on any of said plurality of adjustment notches (43) for adjusting a range of said float cylinder (4); and said float cylinder (4) in a non-flush position being buoyed up by a full reservoir (7) of water so that said shaft (32) is elevated a corresponding distance with said float cylinder (4); said shaft (32) causing said support rod (3) to support said control rod (2) so that said plug (22) of said control rod (2) closes said passage (152) when float cylinder (4) is in a non-flush position; and said float cylinder (4) in a flush position resting on said fixing element (66) so that said shaft (32) is in a lowermost position thereby causing said support rod (3) and said control rod (2) to be said in lowermost position; said passage (152) and said two-way flow cahnnel (64) being open when said float cylinder (4) is in a flush position so that water is urged out of an upper part of said valve chamber (14) under an upward pressure of water on a lower side of said stop valve (5), thereby allowing water to flow freely into said reservoir (7) until said float reaches said non-flush position.

* * * * *